US009285044B2

(12) United States Patent  (10) Patent No.: US 9,285,044 B2
Chambers  (45) Date of Patent: Mar. 15, 2016

(54) RELIEVABLE CHECK VALVE FOR MEDICAL LINES

(71) Applicant: Daniel M. Chambers, Solana Beach, CA (US)

(72) Inventor: Daniel M. Chambers, Solana Beach, CA (US)

( * ) Notice: Subject to any disclaimer, the term of this patent is extended or adjusted under 35 U.S.C. 154(b) by 0 days.

(21) Appl. No.: 14/057,246

(22) Filed: Oct. 18, 2013

(65) Prior Publication Data

US 2014/0110003 A1  Apr. 24, 2014

Related U.S. Application Data

(60) Provisional application No. 61/715,759, filed on Oct. 18, 2012.

(51) Int. Cl.
*F16K 15/14* (2006.01)
*F16K 15/18* (2006.01)
*F16K 15/06* (2006.01)
*F16K 27/02* (2006.01)

(52) U.S. Cl.
CPC .................. *F16K 15/18* (2013.01); *F16K 15/06* (2013.01); *F16K 27/0209* (2013.01); *Y10T 137/7888* (2015.04)

(58) Field of Classification Search
CPC ............ A61M 2039/242; A61M 39/24; F16K 15/141; F16K 15/148; Y10T 137/7888; Y10T 137/7887

USPC ........... 137/495, 513.3, 513.7, 522, 843, 854; 251/129.01, 129.02

See application file for complete search history.

(56) References Cited

U.S. PATENT DOCUMENTS 4,054,152 A * 10/1977 Ito et al. .......................... 137/512
4,615,693 A * 10/1986 Paradis et al. .................. 604/122
5,645,538 A * 7/1997 Richmond ..................... 604/256

* cited by examiner

*Primary Examiner* — Kevin Lee
*Assistant Examiner* — P. Macade Nichols
(74) *Attorney, Agent, or Firm* — Acuity Law Group, P.C.; Daniel M. Chambers

(57) ABSTRACT

This invention concerns relievable normally closed check valves for use in conjunction with fluid delivery systems for medical patients, as well as methods for making and using valves. In the medical context, such valves function at very low fluid pressures, and include a multi-part valve body made from upper and lower housings capable of movement relative to each other that, when operably connected, dispose between them a compliant or deformable, resilient valve element normally biased in the closed position against a valve seat present on the inner surface of the upper housing. The upper housing also includes a lower housing seat. The inside surface of the lower housing contains or supports a structure that positions the valve element to engage the valve seat in the absence of fluid pressure above the valve's pre-determined cracking pressure. The valve's flow prevention function may be relieved in the absence of sufficiently pressurized fluid by causing the valve element to disengage from the valve seat, for example, by adjusting the valve body to distance the valve element from the valve seat.

3 Claims, 1 Drawing Sheet

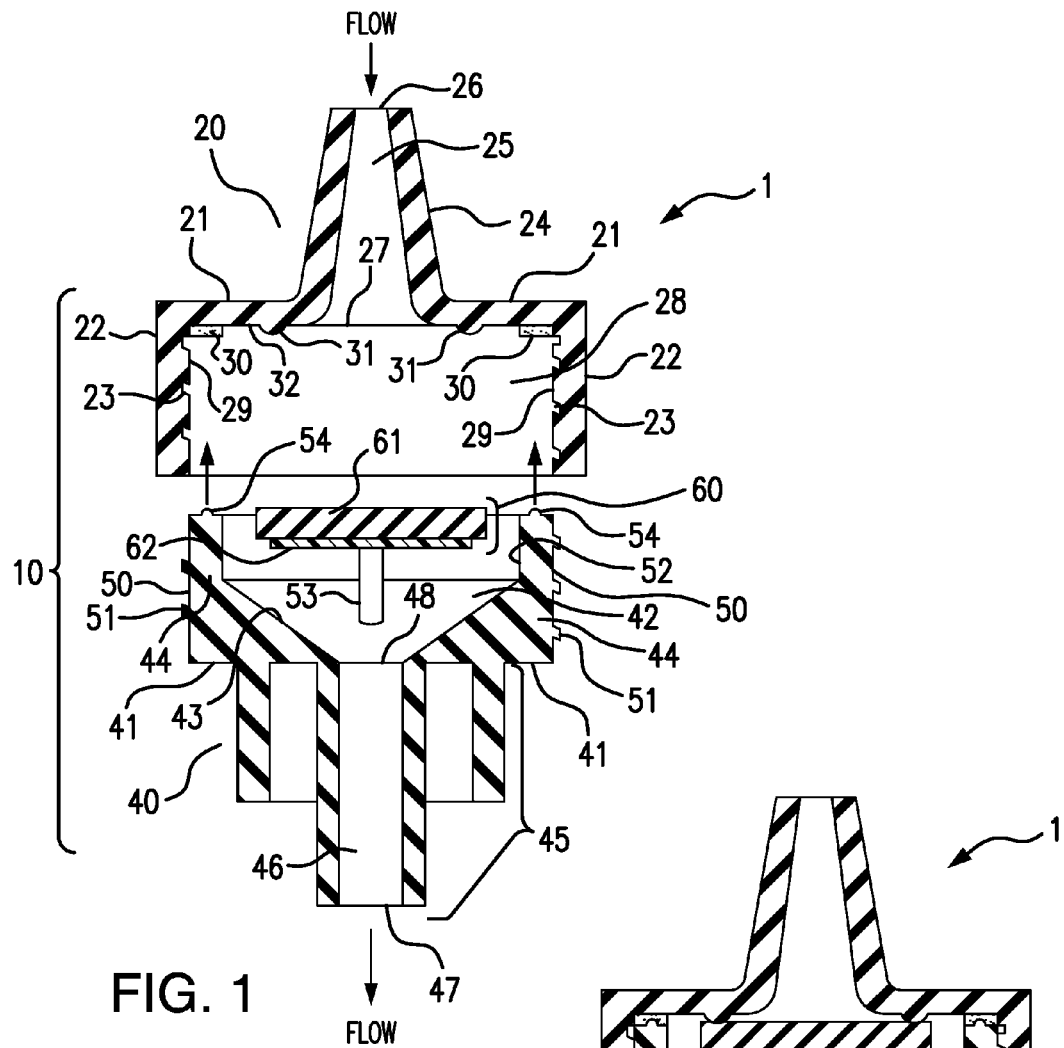
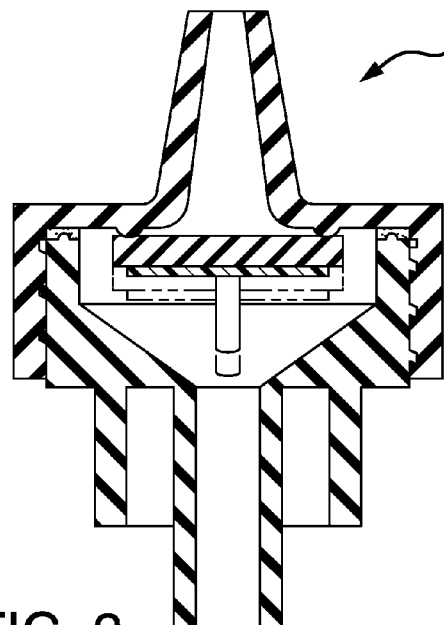
FIG. 1
FIG. 2

RELIEVABLE CHECK VALVE FOR MEDICAL LINES

RELATED APPLICATION

This application claims the benefit of and priority to, U.S. provisional patent application Ser. No. 61/715,759, filed on 18 Oct. 2012, the contents of which are herein incorporated by reference in its entirety for any and all purposes.

GOVERNMENT SUPPORT

None.

BACKGROUND OF THE INVENTION

Field of the Invention

This invention relates generally to relievable, normally closed one-way check valves that permit pressurized fluid flow in only one direction when the fluid is pressurized at or above the valve's cracking pressure, and particularly to valves suitable for use with intravenous catheters and medical lines. Shortcomings of Existing Solutions.

A common shortcoming with conventional, normally closed one-way medical check valves is the inability to rapidly and easily bypass the valve in certain circumstances where the valve is closed and thus prevents fluid from flowing though the valve, for example, when a peristaltic pump fails. To overcome such circumstances in clinical settings today, medical technicians must either exert manual pressure on a fluid reservoir (e.g., an I.V. bag) upstream of the valve in order to overcome the particular check valve's cracking pressure, position the fluid reservoir at a height above the check valve sufficient to create head pressure in the system sufficient to overcome the particular valve's cracking pressure, or, as is often the case, remove the check valve from the series of connectors and tubes that connect the fluid reservoir to the patient's vasculature. Having to exert manual pressure on or repositioning a fluid reservoir is clearly disfavored as very inefficient. Removal of the check valve is not only inefficient, it is also dangerous, as doing so increases the risk of making improper connections (which, in turn, can lead to medical mistakes, e.g., administration of the wrong or too much drug, etc.), and may also disrupt or destabilize a catheter access or insertion point. Thus, there is a clear need for improved check valves and related methods.

DEFINITIONS

Before summarizing or describing the instant invention in detail, several terms used in the context of the invention will be defined. In addition to these terms, others are defined elsewhere in the specification, as necessary. Unless otherwise expressly defined herein, terms of art used in this specification will have their art-recognized meanings.

A "check valve" refers to a mechanical valve that normally allows fluid to flow through it in only one direction, from the upstream direction toward the downstream direction, thereby preventing, or "checking", fluid flow in the other direction. Check valves have at least one fluid inlet port and at least one fluid outlet port. A common type of check valve is a diaphragm check valve, which typically uses a flexing or resilient diaphragm, a spring-loaded ball, or the like in the valve body positioned to create a normally-closed valve. Pressure on the upstream side of the valve element must be greater than the pressure on the downstream side by a certain amount, known as the "cracking pressure" or "pressure differential", for the valve element of the check valve to open and thereby allow fluid flow through the valve, from the inlet port(s) through the valve body and exiting via the outlet port(s). If fluid pressure drops below the valve element's cracking pressure, the valve element automatically returns to its original, closed position against its corresponding valve seat.

A check valve's "cracking pressure" refers to the minimum rated pressure differential required to cause the valve to open and permit fluid flow. A relievable check valve according to the invention will be designed to at operate at a specific, pre-determined cracking pressure (i.e., the "rated" cracking pressure). Preferred cracking pressures for relievable medical check valves according to the invention range from about 0.01 to about 4 pounds per square inch (psi). Particularly preferred cracking pressures include about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, and 4 psi. While this specification focuses on relievable medical check valves, those in the art will appreciate that the instant invention will also apply in the context of check valves designed to operate at much higher fluid pressures, cracking pressures, and with different fluids (including oils, gases, slurries, etc.).

A cracking pressure may be termed to be "pre-determined" or "preset", which means that the cracking pressure is known, either by testing to determine cracking pressure or by calculations that consider such factors as the materials used to build the valve, the sizes, shapes and geometries of the various components, etc.

A "normally closed" check valve refers to one that substantially inhibits, and optimally prevents, fluid flow through the valve. While some leakage around a valve element may be permissible in a given context, preferred valves according to the invention are those that do not leak when closed.

Mechanical components that are "operably connected" means that the components are connected in manner to accomplish the desired function. For example, in the context of the invention, upper and lower housings are "operably connected" when they are joined (or otherwise fitted together) to form a functional valve body of a check valve of the invention, which valve body in many embodiments allows for relative movement of the lower or upper housing in relation to the upper or lower housing, as the case may be, without appreciable leakage, and preferably no leakage, of fluid from inside the valve body from the connection (threaded, pressure fit, or otherwise) between the upper and lower housings. In the preceding sentence, a "functional" valve body refers only to a valve body that provides for fluid ingress through one or more inlet ports located on the upper housing and fluid egress from one or more outlet ports located on the lower housing. In contrast, a "functional" relievable check valve according to the invention is one that provides for cessation of flow when fluid in the system lacks sufficient pressure to overcome the valve's cracking pressure unless and until a medical technician or other user adjusts the valve so as to cause the valve element to disengage from the valve seat and thereby allow fluid having a pressure below the valve's cracking pressure to flow through the valve. In preferred embodiments, even when the valve's fluid-checking functionality is interrupted or relieved, the valve still only permits one-way flow through the valve.

A "patentable" composition, process, machine, or article of manufacture according to the invention means that the subject matter satisfies all statutory requirements for patentability at the time the analysis is performed. For example, with regard to novelty, non-obviousness, or the like, if later investigation reveals that one or more claims encompass one or more embodiments that would negate novelty, non-obviousness, etc., the claim(s), being limited by definition to "patentable" embodiments, specifically exclude the non-patentable embodiment(s). Also, the claims appended hereto are to be interpreted both to provide the broadest reasonable scope, as well as to preserve their validity. Furthermore, the claims are to be interpreted in a way that (1) preserves their validity and (2) provides the broadest reasonable interpretation under the circumstances, if one or more of the statutory requirements for patentability are amended or if the standards change for assessing whether a particular statutory requirement for patentability is satisfied from the time this application is filed or issues as a patent to a time the validity of one or more of the appended claims is again considered.

A "plurality" means more than one.

A "relievable" normally closed check valve refers to one that inhibits or prevents flow when fluid in the system lacks sufficient pressure to overcome the valve's cracking pressure unless and until a technician (e.g., a doctor, medical technician, nurse, paramedic, etc.) or other user adjusts the valve so as to allow fluid flow through the valve. Such relief may be reversible or permanent, depending upon the design of the particular valve.

SUMMARY OF THE INVENTION

The object of this invention is to provide inexpensive, patentable, improved normally closed one-way check valves that allow the flow-prevention feature(s) such valves to be easily and rapidly relieved by a technician or other user when flow pressures are below the particular valve's rated cracking pressure. Valve closure can be relieved in any suitable way, including, for example, by (i) having a technician change, via adjustment initiated or performed by the technician, the physical relationship between various components in the valve, (ii) applying a pressure other than fluid pressure to create a sufficient pressure differential between the inlet and outlet sides of the valve element to cause the valve to open and permit fluid flow, or (iii) providing a second flow path that bypasses the parts of the valve that provide the check valve functionality.

Thus, one aspect of the invention provides simple yet reliable relievable, normally closed one-way check valves in which valve closure in the absence of a sufficient pressure differential to cause valve opening is achieved by changing the physical relationship between various valve components. Changing the physical relationship between various valve components is typically accomplished by a user (e.g., doctor, medical technician, nurse, etc.) making an adjustment to one or more components of the valve.

In general, such valves comprise only a few components and, in the medical context, such valves typically are also designed to function at very low fluid pressures. Such relievable check valves comprise a valve body made from joined upper and lower housings capable of movement in relation to each other in use. The valve body includes a fluid inlet, a fluid outlet, a valve seat and a lower housing seat each disposed in the upper housing, and a deformable, resilient valve element that is positively biased to close against the valve seat in the absence of a pre-determined fluid pressure differential across the valve element. The upper and lower housings can be moved in relation to one another so as to disengage the valve element from the valve seat. Any suitable structure, or combination of structures, that provides such functionality, is within the scope of invention.

Another aspect of the invention concerns relievable one-way check valves that provide the capability for a user to manually disengage the valve element from the valve seat. Any suitable structure, or combination of structures, that provides such disengagement of the valve element from the valve seat is within the scope of the invention. A representative example involves the use magnetic repulsion. Another exemplary configuration allows movement of a mechanical support structure for the valve element in relation to the lower housing, which movement disengages the valve element from the valve seat.

Yet another aspect of the invention concerns relievable one-way check valves having a secondary fluid flow path that allows the primary fluid path, which contains a check valve, to be bypassed when desired.

Together with other objects and advantages, which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE FIGURES

FIG. 1 is an exploded perspective view of the present invention ready for assembly.

FIG. 2 is a cross-sectional side view of an assembled embodiment of a device according to the invention, which embodiment is shown in an exploded cross-sectional side view in FIG. 1.

DETAILED DESCRIPTION OF THE INVENTION

1. Overview

This invention relates to relievable one-way check valves for use in conjunction with fluid delivery systems, particularly systems for delivering fluids and/or medicines to patients undergoing treatment, as well as methods for making and using such relievable check valves. In medicine, such valves function at very low fluid pressures, and inhibit or prevent fluid flow through the valve absent fluid pressure at or above the valve's cracking pressure. That said, as those in the art will appreciate, the invention also envisions much larger relievable one-way check valves, designed to operate at much higher pressures, within its scope.

2. Detailed Description

The object of this invention is to provide inexpensive, patentable, improved normally closed one-way check valves that allow the flow-prevention feature(s) of such valves to be easily and rapidly relieved at flow pressures below the particular valve's cracking pressure. Valve closure can be relieved in any suitable way, including, for example, by changing the physical relationship between various components in the valve, by applying a pressure other than fluid pressure to create a sufficient pressure differential between the inlet and outlet sides of the valve element to cause the valve to open and permit fluid flow, or by providing a second flow path that bypasses the parts of the valve that provide the check valve functionality.

As described below, a relievable one-way check valve of the invention includes a multi-part valve body made from a plurality of housing members. In many preferred embodiments of low-pressure one-way medical check valves according to the invention, the valve body comprises two housing members, a "first" or "upper" housing and a "second" or "lower" housing, designed and manufactured to be operably connected to each other to form the valve body, in many embodiments in a manner that allows for relative movement between the housing members. A valve element is disposed within the valve body, and is positioned by any suitable structure(s) to normally be biased in the closed position against a valve seat in the absence of fluid pressure above the valve's pre-determined cracking pressure. The valve's normally closed position can be relieved by a technician (e.g., a doctor, medical technician, nurse, paramedic, etc.) or other user who adjusts the valve so as to allow fluid flow through the valve. Valve closure can be relieved in any suitable way, including, for example, by changing the physical relationship between various components in the valve, by applying a pressure other than fluid pressure to create a sufficient pressure differential between the inlet and outlet sides of the valve element to cause the valve to open and permit fluid flow, or by providing a second flow path that bypasses the parts of the valve that provide the check valve functionality.

A number of non-limiting, representative preferred embodiments of the invention are described in greater detail below.

A. Relievable Check Valves Having Adjustable Valve Bodies

One aspect of the invention provides simple yet reliable relievable, normally closed one-way check valves in which valve closure in the absence of a sufficient pressure differential to cause valve opening is achieved changing the physical relationship between various valve components. In general, such valves comprise only a few components and, in the medical context, such valves typically are also designed to function at very low fluid pressures.

Such relievable one-way check valves comprise an adjustable valve body made from joined upper and lower housings capable of being moved in relation to each other. The valve body includes a fluid inlet, a fluid outlet, a valve seat and a lower housing seat each disposed in the upper housing, and a deformable, resilient valve element that is positively biased to close against the valve seat in the absence of a pre-determined fluid pressure differential across the valve element. The upper and lower housings can be moved in relation to one another so as to disengage the valve element from the valve seat. Any suitable structure, or combination of structures, that provides such functionality, is within the scope of invention.

Preferred materials for the deformable, resilient valve element include natural or synthetic elastomeric, or rubber-like materials that can compress, deflect, or bend above a pre-determined pressure threshold. In some preferred embodiments, the valve element comprises two components, a first disk comprised of a natural or synthetic flexible, resilient material (or flexible combination of natural or synthetic materials) and a second disk comprised of a semi rigid, resilient material (or combination of materials) that provides support to and prevents distortion of the first disc while also providing the capacity to deform when fluid pressures above the valve's pre-determined cracking pressure are experienced.

In some preferred embodiments, such a configuration is accomplished using a mechanical support structure having a linearly arrayed plurality of spaced valve element posts. In some of these embodiments, the deformable, resilient valve element positioned within the valve body prior to assembly of the upper and lower housings has a flexible, compliant multi-layer construction, wherein the first disk (which contacts the valve seat) is preferably made from pure gum rubber and/or like material and the second, supporting disk is made from a semi-rigid plastic material, such as unplasticized polyvinyl chloride (PVC). Because of the flexible, resilient nature of such a dual disk construction, the disk structure can open under a very low pressure, such as 0.02 pounds per square inch. Opening occurs by bending or deflection of the valve element about a bending axis defined by the linearly arrayed plurality of spaced valve element posts.

In other embodiments, a central support structure comprised of one or more support elements contacts a central support region on the lower portion of the valve element, allowing the valve element to deflect about its periphery to disengage from the valve seat and allow fluid flow when fluid flows into the valve body at a pressure above the pre-determined cracking pressure for the particular valve. In such embodiments, the support structure(s) constantly hold the valve element biased in position against the valve seat unless and until fluid having a pressure above the cracking pressure moves into the valve body.

In preferred embodiments that employ a disk-type valve element, the valve element preferably has an edge profile that minimizes gas bubble formation about its periphery. Preferred edge profiles include a step profile, wherein the upper portion of the valve element (e.g., the first disk), the surface of which engages the valve seat, has, for example, a larger diameter than the lower portion of the valve element (e.g., the second disk). Preferably, the first and second disks are concentrically stacked (and preferably permanently attached) during assembly.

In other embodiments, the valve element comprises a ball to which a seating force is applied by biasing member such as a spring or elastic, compressible component bearing against and holding the ball in place against the valve (or, in these embodiments, ball) seat of the upper housing. The valve element may be supported by a support structure formed as part of, or, alternatively, placed within, the lower housing. After the various components are assembled into a valve body, the biasing member forces the ball against the valve seat, biasing the valve in a normally closed position. In normal operation, fluid flow through the valve becomes possible when the pressure of the fluid flowing into the valve meets or exceeds the valve's pre-determined cracking pressure. If the inlet pressure is reduced such that the pressure differential required to open the valve element is no longer present, the biasing member of the valve element causes the ball to again engage the valve seat, arresting fluid flow through the valve. If desired, flow through the valve of a fluid that exerts a pressure differential across the valve element that is less than that of the valve's cracking pressure can be achieved by relieving the closure of the valve element against the valve seat. This can be accomplished by any suitable structure, or combination of structures, for example, by moving the lower housing in relation to the upper housing so that structures inside the valve body move apart, allowing the valve element to disengage from the valve seat and thereby permit fluid flow.

Thus, in preferred embodiments, easy, rapid relief of one-way check valve functionality is provided by allowing a technician to move the lower and upper housings in relation to one another such that the valve element no longer contacts the valve seat, allowing fluid to flow through the valve without regard to inlet pressure. Any suitable configuration that provides for such relative movement of the lower and upper housings so as to allow the valve element to disengage the valve seat in the absence of fluid flow at or above the check valve's pre-determined cracking pressure can be employed. One such preferred configuration employs threaded lower and upper housings. Such configurations allow the lower housing to be partially disengaged from the upper housing (e.g., by partially unscrewing the lower housing from the upper housing), thereby allowing the valve element to disengage from the valve seat. To restore check valve function, the lower housing can be moved to again fully engage the upper housing, which causes the valve element to again engage the valve seat and thus close the check valve (provided that fluid at or above the cracking pressure is not then flowing through the valve).

If back-flow prevention is desired in a relievable one-way check valve according to the invention, structural provision can be made to allow the valve element to become reseated against the valve seat in the event of back flow. In such embodiments, fluid flow reversal causes the valve element to re-engage the valve seat, thereby preventing back flow. In some embodiments of this type, the valve element may have sufficient buoyancy in the absence of fluid flow to float to and re-engage the valve seat when the valve body is oriented in a way that allows such movement.

Representative Example

FIG. 1 illustrates, in exploded perspective, a particularly preferred embodiment of a relievable one-way check valve according to the invention. As shown, the valve (1) comprises a multi-part valve body (10) made by joining an upper housing (20) to a lower housing (40). The upper housing (20) has a top surface flange (21) having a depending circumferential axially extending wall flange (22) integral therewith. A fluid inlet (24) projects upward from the central region of the top surface flange (21) and has a central bore (25) that extends from the inlet port (26) to an interior opening (27) in the interior (28) of the upper housing (20). The central bore (25) may have any desired shape. In the depicted embodiment, the central bore has a tapering cylindrical configuration. In order to operably connect with the lower housing (40), the interior surface (29) of the wall flange (21) of the upper housing includes female threads (23) therein.

The lower housing (40) has a bottom surface flange (41) whose interior (42) is shaped to form an upwardly expanding cone portion (43). Integral with the upper circumference of the cone portion (43) is a peripheral axially extending flange (44). A fluid outlet in the form of a tapered Luer connector (45) projects downward from the central region of bottom surface flange (41) and has a central bore (46) that extends from the outlet port (47) to an interior opening (48) in the interior (42) of the lower housing (40). If desired, one or more ribs (not) shown may be provided on the inner surface (49) of the extending flange (44). The exterior surface (50) formed by the circumferential exterior faces of bottom surface flange and the axially extending flange (44) includes male threads (51) that match the female threads (23) of the upper housing, allowing the upper and lower housing (20, 40) to be screwed together to form the valve body. Those in the art will also appreciate that in variations of this embodiment, a seal (30) and/or sealing flange need not be present, particularly when the manually adjustable connection between the upper and lower housings (20, 40) itself affords a sufficiently watertight seal for the intended application.

When operably connected, by screwing or otherwise fastening together the upper an lower housings (20, 40), the upper edge of the peripheral axially extending flange (44) has a sealing flange (54) configured to make a sealing connection with a seal (30) positioned at or near the periphery of the interior surface (32) of the top surface flange (21). As with other components of relievable check valves of the invention intended for medical applications, the seal (30) is made from any suitable biocompatible, compressible material. In preferred embodiments, operable connection of lower and upper housings (40, 20) compresses the seal (30), ensuring a watertight connection between the components used to form the valve body (10).

If desired, ribs (or similar structures) may be used to help retain the valve element (60) in its central position within the valve body (10) after assembly of the upper and lower housing elements (20, 40). Ribs (or the like), if present, can, for example, be positioned around the inner circumference (52) of the axially extending flange (44) of the lower housing (40).

In this embodiment, the valve element (60) is of the dual-disk variety. It comprises a first, upper disk (61) made of rubber or a rubber-like material (e.g., silicone) bonded concentrically to a second, lower disk (62) made of a semi-rigid plastic material, preferably an unplasticized plastic, for example, an unplasticized PVC film. In the particular embodiment depicted in FIG. 1, the second disk (62) has a slightly smaller diameter than the upper disk (61).

A representative example of a suitable upper disk is one having the following characteristics. The material is tan pure gum floating natural rubber flat sheet stock having a durometer of 40±5 Shore A, a thickness of 0.031 inches (about 0.8 mm), a specific gravity of 0.92, tensile strength of about 2,500 psi (about 0.175 kg/cm$^2$), and an elongation of at least about 650%. Circular disks having a diameter of 0.375 inches (about 9.5 mm) can be cut from the flat sheet stock using a die. Another representative example of a suitable upper disk is a silicone elastomer (e.g., SILASTIC®, Dow Corning Corp.) having the following characteristics: a durometer of 40-50, a specific gravity of about 1.15, a tensile strength of about 1,000 psi (about 0.07 kg/cm$^2$), and an elongation of at least about 650%. A representative example of a suitable lower disk is one having a diameter of 0.350 inches (about 8.9 mm) die cut from unplasticized PVC flat sheet film stock having a thickness of 0.007-0.0075 inches (about 0.18-0.19 mm), a specific gravity of 1.3, tensile strength of 5,700 psi (about 0.4 kg/cm$^2$), elongation of 125%, and a Rockwell Hardness of R98-106

Returning to FIG. 1, the valve element (60) is positioned on linearly arrayed, spaced support posts (53) extending from the face of the upwardly expanding cone portion (43) of the bottom surface flange (41) of the lower housing (40). After assembly into a valve body, the spaced support posts (53) firmly and positively bias the valve element (60) into engagement with the valve seat (31) disposed on the interior surface (32) of the top surface flange (21).

In operation, the normal position of the valve element (60) is that of sealing engagement with the valve seat (31), preventing fluid flow through the valve unless or until the valve's cracking pressure is met or exceeded. In the embodiment depicted in FIG. 1, when a technician or other user wishes to relieve the valve's valving function (i.e., control of fluid flow by opening or closing a valve), s/he moves the lower and upper housings (40, 20) relative to one another by partially unscrewing the housings, thereby causing the surface of the expanding cone portion (43) to move away from the interior surface (32) of the top surface flange (21), which in turn causes the valve element (60) to move away from the valve seat (31). Provided there is sufficient relative movement between the upper and lower housings (20, 40), the valve element (60) disengages from the valve seat (31), allowing fluid to flow through the valve under conditions wherein the pressure differential between the inlet and outlet sides of the valve element is less than the valve's cracking pressure. Preferably, although not essentially, under such conditions, even though the valve element (60) disengages from the valve seat (31), the sealing flange (54) of the lower housing continues to be in sealing contact with the upper housing's seal (30).

In a variation on this example, the upper and lower housings can be modified to include one or more structural features that signal to a user that the valving function of the valve has been relieved (i.e., the valve element has been disengaged from the valve seat to permit fluid flow even if the pressure differential across the valve element is less than the valve's rated cracking pressure) prevents the housings from being unscrewed, for example, more than necessary. For instance, the valve body may be designed so that under normal use, i.e., the valve is closed unless its rated cracking pressure is exceeded, the peripheral upper edge of the axially extending wall flange (22) extends sufficiently above the outer surface of the bottom surface flange (41) so as to create a lip or edge effect that can easily be tactily sensed by a user's finger. In contrast, when the upper and lower housings have been sufficiently moved to provide relief of valve function, the lip or edge effect can no longer be felt.

In another variation, the upper and lower housings have structural features that prevent relative movement beyond more than a predetermined amount.

In still another variation, rotation of one housing in relation to the other housing results in a visible change that can be observed by the user. For example, a window in one housing may expose one of two or more different colors or symbols to be visible in the window to signal whether the valve is the closed (i.e., fluid flow checking position) or open ((i.e., flow checking function relieved) position. Colored panels such as red and green, "−" and "+", or the like may be used to indicate whether the valve's check function is operation or not, respectively.

B. Relievable Check Valves Using a Non-Flow Pressure Differential

Another aspect of the invention concerns relievable one-way check valves wherein a pressure other than fluid pressure is used to create a sufficient pressure differential across the valve element to cause the valve to open and permit fluid flow. Any suitable structure, or combination of structures, that provides such disengagement of the valve element from the valve seat is within the scope of the invention. A representative example involves the use magnetic repulsion. Another exemplary configuration allows movement of a mechanical support structure for the valve element in relation to the lower housing, which movement disengages the valve element from the valve seat.

C. Relievable Check Valves Having a Fluid Bypass

Yet another aspect of the invention concerns relievable one-way check valves having a secondary fluid flow path that allows the primary fluid path, which contains a check valve, to be bypassed when desired.

All of the articles and methods described and claimed herein can be made and executed without undue experimentation in light of the present specification. While the articles and methods of this invention have been described in terms of preferred embodiments, it will be apparent to those of skill in the art that variations may be applied to the articles and methods. All such similar substitutes and modifications apparent to those skilled in the art are deemed to be within the spirit and scope of the invention as defined by the appended claims.

All patents, patent applications, and publications mentioned in the specification are indicative of the levels of those of ordinary skill in the art to which the invention pertains. All patents, patent applications, and publications, including those to which priority or another benefit is claimed, are herein incorporated by reference to the same extent as if each individual publication was specifically and individually indicated to be incorporated by reference.

The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention claimed is:

1. A relievable one-way check valve, comprising:
   (a) a valve body comprised of an upper housing joined to a lower housing, wherein the upper housing comprises a fluid inlet and a valve seat and the lower housing comprises a fluid outlet;
   (b) a valve element disposed within the valve body that is biased against the valve seat in a normally closed position but that opens when exposed to a pressure differential that meets or exceeds a rated cracking pressure for the valve; and
   (c) a valve relief feature that, when actuated by a user, opens the valve to fluid flow at a pressure that is less than a rated cracking pressure for the valve, wherein the valve relief feature allows for user-directed movement of the upper housing in relation to the lower housing so as to allow the valve element to move in relation to the valve seat so as to allow fluid to traverse the valve when the pressure differential experienced by the valve element is less than the rated cracking pressure for the valve.

2. A valve according to claim 1, wherein the valve relief feature, when actuated, causes change in a physical relationship between the valve seat and valve element, resulting in fluid flow through the valve even if the pressure differential across the valve element is less than the rated cracking pressure for the valve.

3. A valve according to claim 1, wherein the valve relief feature, when actuated, causes application of a pressure other than fluid pressure to create a sufficient pressure differential between a fluid inlet side and a fluid outlet side of the valve element to cause the valve to open and permit fluid flow.

* * * * *